United States Patent Office 3,449,404
Patented June 10, 1969

3,449,404
PROCESS FOR THE PREPARATION OF ESTERS OF ALKYL BENZENE MONOCARBOXYLIC ACIDS CHLORINATED IN THE NUCLEUS
Gustav Renckhoff, Witten (Ruhr), Germany, assignor to Chemische Werke Witten GmbH., Witten (Ruhr), Germany
No Drawing. Filed Nov. 8, 1963, Ser. No. 322,534
Claims priority, application Germany, Feb. 20, 1963, C 29,207
Int. Cl. C07c 63/04
U.S. Cl. 260—476                 13 Claims Esters of alkyl benzene carboxylic acids chlorinated in the benzene nucleus, particularly chlorinated toluic acid esters, have heretofore been only difficultly obtainable as they had to be prepared by esterification of the corresponding chlorinated acids which, in turn, are obtainable only in an indirect manner. The direct nuclear chlorination of the alkyl benzene carboxylic acids is generally impossible; thus, in order to obtain, for example, 3-chloro-4-methylbenzoic acid, it is necessary to start with 2-chloro-p-1-cymene which is partially oxidized with nitric acid to chlorotoluic acid.

French Patent No. 1,169,383 describes a process for the preparation of toluic acid chlorides which are chlorinated in the nucleus and which may serve as simple starting material for the corresponding esters. The production of acid chlorides is expensive, however, and working with these extremely moisture-sensitive and corrosive substances is very inconvenient.

Also previously described are processes for the chlorination of toluic acid esters, during exposure to light, in which reaction is effected at different temperature conditions. At temperatures above 100° C., both the alkyl group and the ester group are chlorinated and trichloromethyl benzoyl chloride is obtained. The chlorination may, however, also be effected at low temperatures in a manner such that predominantly monochloromethyl benzoic acid methyl ester is formed. However, in this case also, the ester group is still chlorinated to a certain extent.

Nothing has been heretofore disclosed concerning the nuclear chlorination of aromatic carboxylic acid esters. It was also not to be expected that such a reaction would occur under conditions in which the ester group remains intact, as the reactivity of the aromatic nucleus is sharply reduced by the carbalkoxy group.

It has now been found that esters of alkyl benzene monocarboxylic acids, chlorinated exclusively in the nucleus, may be obtained if esters of alkyl benzene monocarboxylic acids, having one or several alkyl groups of from 1 to 4 carbon atoms, and alkanols, having from 1 to 4 carbon atoms, particularly the isomeric toluic acid methyl esters, are treated with chlorine in the presence of a chlorination catalyst, preferably iron-III-chloride and/or aluminum chloride, at temperatures below 50° C., if desired in the presence of solvents, while excluding light from the reaction mixture.

Under these conditions, chlorination products are obtained in which the chlorine is present exclusively in the benzene nucleus and in which the ester group is unaffected. The reaction preferentially produces monochloro derivatives. In the case of esters having several alkyl groups on the benzene nucleus, such as, for example, 2,4-dimethylbenzoic acid methyl ester, two chlorine atoms may become linked to the nucleus.

The reaction temperature is preferably in the range of about 20 to 50° C. While chlorination will occur below this temperature range, the reaction will then proceed only very slowly and with a poor utilization of chlorine. At temperatures above 50° C., a split-off of the ester group occurs so that, instead of the chlorinated ester, the corresponding chlorinated acid and methyl chloride are obtained.

Those catalysts may be used which are known to be effective in the nuclear chlorination of aromatic compounds, for example, iron, antimony, antimony chloride, molybdenum chloride, titanium-IV-chloride, tin-IV-chloride, iodine, iodine-I-chloride, and the like. Particularly useful are iron-III-chloride or aluminum chloride, or mixtures thereof. The amount of catalyst employed is preferably in the range of about 1 to 10% by weight based upon the quantity of ester treated, but greater quantities may also be utilized, if desired.

Starting materials contemplated by the present invention are the esters of the alkyl benzoic acids, having one or several alkyl residues of from 1 to 4 carbon atoms, with alkanols, having from 1 to 4 carbon atoms, for example the methyl-, ethyl-, propyl-, and butyl esters of the isomeric toluic acids, the dimethylbenzoic acids, the tert-butylbenzoic acids, and the like. The process is primarily employed in the chlorination of the methyl esters of the toluic acids.

Where the esters are liquid, they may be chlorinated, after the addition of the catalyst, up to the desired absorption of chlorine by the introduction of chlorine, if desired while cooling in order to remove the reaction heat.

Where the esters are solid at the reaction temperature, inert solvents, such as carbon tetrachloride, may also be added.

The chlorination is advantageously terminated when about 50 to 60% of the calculated quantity of chlorine has been absorbed, since the rate of chlorine absorption will thereafter be sharply reduced. The separation of the unreacted starting ester from the chlorination product is easily effected by distillation, since the boiling points of the two compounds are sufficiently far apart.

To obtain a better chlorine efficiency during the reaction, it may be advantageous to perform it continuously in countercurrent flow, or to feed the waste gas of a first chlorination stage to a second chlorination stage.

The chlorinated esters of the alkyl benzoic acids are valuable products for organic syntheses. Thus, the chlorotoluic acid esters, for example, may be used as starting materials for the preparation of chlorophthalic acids. They possess, additionally, great importance as solvents, as softeners for plastics, and as insecticides.

The invention will be further illustrated by reference to the following specific examples:

EXAMPLE I 1,500 g. (10 moles) of p-toluic acid methyl ester are melted by heating to 40° C. and mixed with 30 g. of iron-III-chloride. A chlorine stream is introduced into the melt at a rate of 1 liter per minute, in the dark, for 5 hours at a temperature in the range of 40 to 50° C., during which time cooling initially must be effected and some heat later applied to maintain the desired temperature. The dissolved chlorine is subsequently removed by blowing it out with air and the catalyst is removed by shaking the reaction mixture with water. The reaction mixture, which has a weight of 1,690 g., is then distilled in vacuo; 650 g. of unreacted p-toluic acid methyl ester are thereby initially recovered. After recovery of an intermediate fraction weighing 45 g., 995 g. of 3-chloro-4-methylbenzoic acid methyl ester distill at a temperature of 119 to 121° C. and 10 torr, which corresponds to a yield of 95%, based upon the quantity of p-toluic acid methyl ester reacted. The chlorinated ester has a melting point of 28 to 29° C., a saponification number of 305 (calculated: 304), and a chlorine content of 19.1% by weight (calculated: 19.2%).

EXAMPLE II

A chlorine stream is introduced into 164 g. (1 mole) of 2,4-dimethylbenzoic acid methyl ester at a rate of 0.5 liter per minute, in the dark, for 4 hours after the addition of 3.2 g. of iron-III-chloride, while the temperature is maintained between 20 and 30° C.; for this purpose, water cooling is initially required. The introduction of chlorine is then continued for another hour at 40° C. and the reaction mixture is treated with dilute hydrochloric acid and water to remove the catalyst. During distillation in vacuo, 15 g. of the unreacted starting material are recovered. Then, 141 g. of x-chloro-2,4-dimethyl benzoic acid methyl ester distill at 136 to 138° C. and 15 torr, which corresponds to a yield of 78%, based upon the amount of 2,4-dimethyl benzoic acid methyl ester reacted. The chlorine content is 17.7% by weight (calculated: 17.85%), and the saponifiable chlorine is 0. Another 35 g. of an ester, having a chlorine content of 24%, then distill at 3 torr and at a temperature of 120 to 140° C. This product is a mixture of mono- and dichloro-2,4-dimethybenzoic acid methyl esters.

EXAMPLE III

A chlorine stream is introduced at a rate of 0.5 liter per minute into 672 g. of p-toluic acid butyl ester (3.5 moles) for 2.5 hours, in the dark, after the addition of 13 g. of iron-III-chloride and 6 g. of aluminum chloride, whereby the temperature is increased from 30 to 50° C. After blowing out the dissolved chlorine and removing the catalyst, the reaction mixture is distilled in vacuo and 415 g. of unreacted p-toluic acid butyl ester are recovered having a boiling point of 130 to 133° C. at 10 torr. After recovering another fraction of 41 g., 262 g. of 3-chloro-4-methylbenzoic acid butyl ester distill at 151 to 153° C. and 10 torr. The chlorine content is 15.4% by weight (calculated: 15.65%), the saponification number is 249 (calculated: 247), and the saponifiable chlorine is 0. The yield corresponds to 86.5%, based upon the quantity of p-toluic acid butyl ester reacted.

EXAMPLE IV

A chlorine stream is introduced at a rate of 0.5 liter per minute into 234 g. of p-tert-butylbenzoic acid butyl ester, in the dark, for 5 hours after the addition of 4.6 g. of iron-III-chloride. Since the chlorine is slowly absorbed, another 9.3 g. of iron-III-chloride are added and the introduction of chlorine is continued for another 8 hours at a temperature of 40 to 50° C. After removing the catalyst, the reaction mixture is distilled in vacuo and an initial quantity of 90 g. of unreacted p-tert-butylbenzoic acid butyl ester are recovered at 162 to 164° C. and 10 torr. After recovering another fraction of 25 g., 91 g. of 3-chloro-4-p-tert-butylbenzoic acid butyl ester distill at 176 to 179° C. and 10 torr. The chlorine content is 13.0% by weight (calculated: 13.2%), the saponification number is 211 (calculated: 209), and the saponifiable chlorine is 0. The 3-chloro-4-p-tert-butylbenzoic acid, which melts at 179° C., is obtained by saponification of the liquid butyl ester with alkali. The acid number is 265 (calculated: 264) and the chlorine content is 16.65% by weight (calculated: 16.7%).

EXAMPLE V

A chlorine stream is introduced at a rate of 0.5 liter per minute into 300 g. of p-toluic acid methyl ester for 7 hours, in the dark, and at a temperature of 30 to 50° C., after the addition of 6 g. of titanium-IV-chloride. After blowing out the dissolved chlorine and hydrolyzing the catalyst by shaking the reaction mixture with water, distillation in vacuo is effected, after filtering off the titanium hydroxide; 126 g. of unchanged p-toluic acid methyl ester are initially recovered. After recovering an intermediate fraction of 26 g., the 3-chloro-4-methylbenzoic acid methyl ester is distilled at 122 to 124° C. and 12 torr; 181 g. of this ester, having a chlorine content of 18.9% by weight (calculated: 19.2%) are obtained. The saponification number is 305 (calculated: 304), and the melting point is 28° C.

EXAMPLE VI

A chlorine steam is introduced at a rate of 1 liter per minute into 1,050 g. (7 moles) of m-toluic acid methyl ester, in the dark, for 5.5 hours at a temperature of 50° C. after the addition of 23 g. of iron-III-chloride. After blowing out the dissolved chlorine and removing the catalyst, the reaction mixture is distilled in vacuo; 587 g. of unreacted m-toluic acid methyl ester are initially recovered. After recovering an intermediate fraction of 67 g., 530 g. of x-chloro-3-methylbenzoic acid methyl ester distill at 122 to 124° C. and 12 torr, which corresponds to a yield of 93% based upon the quantity of starting material reacted. The saponification number is 306 (calculated: 304), the chlorine content is 19.1% by weight (calculated: 19.2), and the saponifiable chlorine is 0. The chlorinated ester obtained is an isomeric mixture which, as shown by a gas-chromatographic investigation, contains about 30% by weight of the 4-chloro-3-methylbenzoic acid methyl ester, while the remaining 70% probably is the 6-chloro isomer.

If the reaction temperature is increased during the chlorination to above 50° C., a splitting of the ester bond occurs with the formation of the free nuclear-chlorinated acid, as shown in the following example.

EXAMPLE VII

A chlorine stream is introduced at a rate of 1 liter per minute into 300 g. of p-toluic acid methyl ester, in the dark, for 10 hours after the addition of 6 g. of iron-III-chloride, whereby the temperature is maintained at 70 and 80° C. for the first 5 hours. During this time, crystallization gradually occurs so that the temperature must be increased to 120° C. during the remainder of the reaction in order to avoid clogging of the chlorine inlet.

Upon cooling, the reaction mixture solidifies to a thick crystal sludge which is stirred with the same volume of carbon tetrachloride. The crystals are separated, washed with carbon tetrachloride, and recrystallized from toluene; 53 g. of 3-chloro-4-methylbenzoic acid, having a melting point of 196 to 198° C. corr., are obtained. The acid number is 328 (calculated: 329), the saponification number is 328.5, the chlorine content is 21.0% by weight (calculated: 20.8%), and the saponifiable chlorine is 0. An additional quantity of the acid may be recovered from the carbon tetrachloride-containing filtrate by shaking it with soda solution. After shaking to remove the acid, the carbon tetrachloride is volatilized and the residue is distilled in vacuo. After recovering a preliminary fraction of unreacted p-toluic acid methyl ester, 3-chloro-4-methylbenzoic acid methyl ester is obtained, having a melting point of 28° C.

It will be obvious to those skilled in the art that many modifications may be made within the scope of the present invention without departing from the spirit thereof, and the invention includes all such modifications.

What is claimed is:

1. A process for the preparation of an alkyl benzene monocarboxylic acid ester which is chlorinated in the aromatic nucleus only, said ester being of an alkyl benzene monocarboxylic acid having at least one alkyl group of 1 to 4 carbon atoms with an alkanol having 1 to 4 carbon atoms, which comprises treating said alkyl benzene monocarboxylic acid ester with chlorine in the presence of a nuclear chlorination catalyst selected from the group consisting of iron-III-chloride, aluminum chloride and titanium-IV-chloride, and while excluding light from the reaction mixture, at a temperature below 50° C.

2. A process according to claim 1 in which the chlorination is effected in the presence of a solvent.

3. A process according to claim 1 in which the catalyst is iron-III-chloride.

4. A process according to claim 1 in which the catalyst is aluminum chloride.

5. A process according to claim 1 in which the catalyst is titanium-IV-chloride.

6. A process according to claim 1 in which the ester which is chlorinated is p-toluic acid methyl ester.

7. A process according to claim 1 in which the ester which is chlorinated is 2,4-dimethylbenzoic acid methyl ester.

8. A process according to claim 1 in which the ester which is chlorinated is p-toluic acid butyl ester.

9. A process according to claim 1 in which the ester which is chlorinated is p-tert-butylbenzoic acid butyl ester.

10. A process according to claim 1 in which the ester which is chlorinated is m-toluic acid methyl ester.

11. A process for the preparation of an alkyl benzene monocarboxylic acid ester which is chlorinated in the aromatic nucleus only, which comprises reacting an alkyl benzenemonocarboxylic acid ester, said alkyl group having from 1 to 4 carbon atoms and the alcohol moiety of the ester group being alkyl of 1 to 4 carbon atoms, with chlorine in the presence of a nuclear chlorination catalyst selected from the group consisting of iron-III-chloride, aluminum chloride and mixtures thereof, and while excluding light from the reaction mixture, at a temperature in the range of about 20 to 50° C.

12. A process according to claim 11 in which the ester is selected from the group consisting of the $C_1$–$C_4$-alkyl esters of the isomeric toluic acids.

13. A process according to claim 1 in which said catalyst is selected from the group consisting of iron-III-chloride, aluminum chloride and mixtures thereof.

References Cited

FOREIGN PATENTS 831,051 3/1960 Great Britain.
835,727 12/1938 France.

OTHER REFERENCES

Sconce: "Chlorine, Its Manufacture Properties and Uses," New York, 1962, pp. 837, 843, 848 and 844.

Van der Linden: Recueil des Mavaux Chimiques, vol. 31, pp. 236–239, 1912.

Groggins: Unit Processes in Organic Synthesis, McGraw-Hill, New York, 1952, pp. 176–177 and 206–207.

Sconce: Chlorine, Its Manufacture Properties and Uses, New York, Reinhold, 1962, p. 848.

LORRAINE A. WEINBERGER, *Primary Examiner.*
ALBERT P. HALLUIN, *Assistant Examiner.*